United States Patent
Everts

(10) Patent No.: US 11,387,730 B2
(45) Date of Patent: Jul. 12, 2022

(54) ELECTRICAL POWER CONVERTER

(71) Applicant: PRODRIVE TECHNOLOGIES INNOVATION SERVICES B.V., Son en Breugel (NL)

(72) Inventor: Jordi Everts, Son en Breugel (NL)

(73) Assignee: PRODRIVE TECHNOLOGIES INNOVATION SERVICES B.V., Son en Breugel (NL)

( * ) Notice: Subject to any disclaimer, the term of this patent is extended or adjusted under 35 U.S.C. 154(b) by 0 days.

(21) Appl. No.: 17/289,618

(22) PCT Filed: Oct. 31, 2019

(86) PCT No.: PCT/EP2019/079884
§ 371 (c)(1),
(2) Date: Apr. 28, 2021

(87) PCT Pub. No.: WO2020/089419
PCT Pub. Date: May 7, 2020

(65) Prior Publication Data
US 2021/0399629 A1 Dec. 23, 2021

(30) Foreign Application Priority Data

Nov. 2, 2018 (NL) .................................... 2021926

(51) Int. Cl.
*H02M 1/42* (2007.01)
*H02M 7/217* (2006.01)
*H02M 1/00* (2006.01)

(52) U.S. Cl.
CPC ....... *H02M 1/4216* (2013.01); *H02M 1/4225* (2013.01); *H02M 1/4283* (2021.05);
(Continued)

(58) Field of Classification Search
CPC ...... H02M 7/04; H02M 7/219; H02M 1/0085; H02M 1/4216; H02M 1/4233; H02M 1/4225

See application file for complete search history.

(56) References Cited

U.S. PATENT DOCUMENTS 5,784,269 A * 7/1998 Jacobs ................. H02M 3/158
363/89
5,946,203 A * 8/1999 Jiang .................. H02M 1/4216
363/47

(Continued)

FOREIGN PATENT DOCUMENTS

AT          516643 B1    2/2018
CH          704553 B1 *  6/2016   .......... H02M 1/4216

(Continued)

OTHER PUBLICATIONS

International Search Report and Written Opinion of the International Searching Authority from the European Patent Office, in PCT/EP2019/079884 dated Feb. 5, 2020, which is an international application corresponding to this U.S. application.

(Continued)

*Primary Examiner* — Gary A Nash
(74) *Attorney, Agent, or Firm* — Kolitch Romano LLP

(57) ABSTRACT

A converter for converting a three-phase AC input into a DC output may include three phase input terminals and two output terminals, a phase selector for connecting the three-phase AC input to an upper intermediate node, a lower intermediate node, and a middle intermediate node. The phase selector includes semiconductor switches for selectively connecting the middle intermediate node to the three phase input terminals, and a controller. The electrical converter includes a boost circuit and a buck-boost circuit. The boost circuit includes an upper boost circuit, a lower boost circuit, and a common node. The buck-boost circuit has an (Continued)

output connected to the two output terminals in parallel with an output of the boost circuit, and includes at least two semiconductor switches that are actively switchable and connected in series across the output terminals. The middle intermediate node is connected to a common node of the two second semiconductor switches.

16 Claims, 12 Drawing Sheets

(52) U.S. Cl.
CPC .......... *H02M 7/217* (2013.01); *H02M 1/0085* (2021.05); *H02M 1/4233* (2013.01)

(56) References Cited

U.S. PATENT DOCUMENTS

| | | | | |
|---|---|---|---|---|
| 6,038,151 A | * | 3/2000 | Jiang | H02M 1/4216 363/44 |
| 6,046,915 A | * | 4/2000 | Jacobs | H02M 3/158 363/39 |
| 2010/0315849 A1 | | 12/2010 | Ingemi et al. | |
| 2017/0279287 A1 | * | 9/2017 | Solodovnik | H02J 7/007182 |

FOREIGN PATENT DOCUMENTS

| | | | |
|---|---|---|---|
| CN | 105553249 A | 5/2016 | |
| CN | 107070196 A | 8/2017 | |
| DE | 102013212229 A1 * | 12/2014 | .......... B60L 11/1803 |
| EP | 3113345 A1 * | 1/2017 | .............. H02M 1/12 |
| EP | 3113345 A1 | 4/2017 | |

OTHER PUBLICATIONS

Barbosa, Peter et al.; "Analysis and Evaluation of the Two-Switch Three-Level Boost Rectifier"; IEEE Power Electronics Specialists Conference; Jun. 2001.
Erickson, Robert W., et al.; "Fundamentals of Power Electronics"; obtained from https://eleccompengineering.files.wordpress.com/2015/01/fundamentals-of-power-electronics_2nd_erickson_full.pdf; retrieved Mar. 2018.
Kolar, Johann W., et al.; "The Essence of Three-Phase PFC Rectifier Systems-Part I"; IEEE Transactions on Power Electronics, vol. 28, No. 1; Jan. 2013.
Friedli, T., et al.; "The Essence of Three-Phase PFC Rectifier Systems—Part II," IEEE Transactions on Power Electronics, vol. 29, No. 2, Feb. 2014.
Schrittwieser, L., et al.; "99% Efficient Three-Phase Buck-Type SiC MOSFET PFC Rectifier Minimizing Life Cycle Cost in DC Data Centers"; IEEE International Telecommunications Energy Conference; Oct. 2016.
Silva, Marcelo, et al.; "Isolated Swiss-Forward Three-Phase Rectifier With Resonant Reset"; IEEE Transactions on Power Electronics, Institute of Electrical and Electronics Engineers, USA, vol. 31, No. 7, Jul. 2016.

* cited by examiner

ELECTRICAL POWER CONVERTER

TECHNICAL FIELD

The present disclosure relates to the field of electrical power conversion. In particular, the present disclosure relates to an electrical converter and a method for controlling the electrical converter.

INTRODUCTION

For example, when the battery of an electric vehicle is charged, the AC voltage from an electrical grid is converted by an electrical converter into a DC voltage which is then provided to the battery that is being charged. For example, an electrical converter may convert a three-phase AC voltage into a DC voltage between the terminals of a DC bus to which the high-voltage (e.g. 800 V) battery of the vehicle may be connected. Also wireless charging systems for electric cars, or gradient amplifiers for Magnetic Resonance Imaging (MRI) scanners typically need such three-phase AC-to-DC conversion to create a high-voltage DC bus from which power can be drawn.

Usually the current that is drawn by the electrical converter from each phase of the three-phase grid, for example when a load draws power from the DC output of the electrical converter, needs to be substantially sinusoidal and substantially in phase with the sinusoidal voltage of that particular phase, resulting in a power factor that is substantially equal to one. Therefore, the three-phase AC-to-DC conversion advantageously requires a three-phase Power Factor Correcting (PFC) electrical AC-to-DC converter. Also low distortion, for example a low Total Harmonic Distortion (THD), of the grid current is typically required for such PFC converters.

Typically, when the voltage between the DC bus terminals is higher than the full-wave rectified AC voltage, boost-type electrical converters are used, comprising a boost-type PFC stage with a 700-800 V DC output.

For example, in T. Friedli, M. Hartmann, J. W. Kolar, "The Essence of Three-Phase PFC Rectifier Systems—Part II," IEEE Transactions on Power Electronics, vol. 29, no. 2, pp. 543-560, February 2014, electrical converters are shown which are used for three-phase AC to high voltage DC conversion. For example, the six-switch boost-type PFC rectifier or the VIENNA rectifier are conventionally used for this purpose.

SUMMARY

It is an objective of the present disclosure to provide a low cost electrical converter for three-phase boost-type PFC AC-to-DC conversion that has one or more of the following advantages:

it is simple to design, it has a high power-to-volume ratio which is enabled by little magnetic energy storage in the electrical converter, it generates low current distortions at its input, it is able to draw substantially sinusoidal currents at its inputs, at a power factor that is substantially equal to one, and the temperature variations of the semiconductor devices is reduced within a period of the input voltage or grid voltage, which results in increased lifetime and reliability.

According to a first aspect of the present disclosure, there is therefore provided an electrical converter for converting a three-phase AC input into a DC output.

Electrical converters according to the present disclosure feature a phase selector for converting a three-phase AC voltage provided at three phase inputs of the electrical converter into three DC voltages provided between an upper intermediate node, a middle intermediate node, and a lower intermediate node. The electrical converter further comprises an output power stage comprising a boost circuit for converting a voltage at the upper intermediate node and the lower intermediate node to an output voltage at the two output terminals. According to an aspect, the electrical converter comprises a buck-boost circuit connected to the middle intermediate node. The buck-boost circuit comprises at least two semiconductor switches that are actively switchable. These semiconductor switches are connected in series across the output terminals. The middle intermediate node is connected to a common node of these semiconductor switches. Output filter capacitors can be connected between the two output terminals of the electrical converter.

The phase selector, which may be seen as an input power stage, comprises actively switchable semiconductor switches which are controlled such that the phase input with the highest voltage of the three-phase AC input voltage is connected to the upper intermediate node, the phase input with the lowest voltage of the three-phase AC input voltage is connected to the lower intermediate node, and the phase input having a voltage between the highest voltage and the lowest voltage is connected to the middle intermediate node. In some embodiments, the three intermediate DC voltages provided between the upper intermediate voltage node, the middle intermediate voltage node, and the lower intermediate voltage node show piece-wise sinusoidal shapes.

The boost circuit advantageously comprises an upper boost circuit connected to the upper intermediate node, and a lower boost circuit connected to the lower intermediate voltage node. The upper and lower boost circuits are connected between a common node and an upper and lower output terminal, respectively. The upper and lower boost circuits can each comprise, or consist of, a bridge leg, each comprising an actively switchable semiconductor switch that is advantageously controlled by a pulse width modulation (PWM) control signal to control a current through the circuit, in particular the current through a corresponding inductor. Therewith, and as a result of the operation of the phase selector, the upper boost circuit controls the current in the phase input with the highest voltage of the three-phase AC input voltage, and the lower boost circuit controls the current in the phase input with the lowest voltage of the three-phase AC input voltage. In addition, the buck-boost circuit controls the current in the phase input having a voltage between the highest voltage and the lowest voltage. The boost circuit and the buck-boost circuit advantageously comprise one or more inductors.

Advantageously, a current control loop is provided that generates appropriate pulse width modulated (PWM) control signals that control semiconductor switches of both (upper and lower) boost circuits and of the buck-boost circuit so as to control the current in each inductor or phase input. Advantageously, the pulse width modulated control signals that control semiconductor switches of the boost circuit (upper and lower boost circuit) and of the buck-boost circuit are interleaved so as to reduce the current stress (and thus potentially also the size) of the output filter capacitors, e.g. minimizing the ripple value and/or the RMS value of the output capacitor currents.

According to an aspect of the present disclosure, the electrical converter comprises an input filter. The input filter is operably coupled to, and may be considered as forming part of, the boost circuit and/or the buck-boost circuit. The input filter advantageously comprises an inductor operably connected to each one of the upper intermediate node, the lower intermediate node and the middle intermediate node. The inductors can be connected in various ways. In one example, they are connected between the respective intermediate node and the boost circuit, respectively the buck-boost circuit. In an alternative example, they are connected between the phase input terminals and the phase selector.

The input filter can further comprise filter capacitors operably coupled to the inductors. The filter capacitors are advantageously connected between the phase input terminals and the above inductors. When the inductors are connected between the respective intermediate node and the boost circuit, respectively the buck-boost circuit, the filter capacitors can be arranged either between the intermediate nodes and the above inductors, or between the phase input terminals and the phase selector. When the inductors are connected between the phase input terminals and the phase selector, the filter capacitors are connected between the phase input terminals and the inductors. In each case, the filter capacitors advantageously interconnect the upper intermediate node, the middle intermediate node, and the lower intermediate node. In each case, the filter capacitors are advantageously interconnected in a star configuration. When a star configuration is used, a star point is connected to a common node of the boost circuit, e.g. the node between the upper boost circuit and the lower boost circuit.

The upper boost circuit, the lower boost circuit and the buck-boost circuit comprise actively switchable semiconductor switches which are controlled through pulse width modulation. The pulse width modulated control signals are generated by current controllers for each of the upper boost circuit, the lower boost circuit and the buck-boost circuit individually. A first current controller is configured to generate a first pulse width modulated control signal for the at least two second semiconductor switches. Pulse width modulation of the at least two second semiconductor switches, allows for controlling a first current in a first one of the inductors operably connected to the buck-boost circuit. A second current controller is configured to generate a second pulse width modulated control signal for the third semiconductor switch. Pulse width modulation of the third semiconductor switch allows for controlling a second current in a second one of the inductors operably connected to the upper boost circuit. A third current controller is configured to generate a third pulse width modulated control signal for the fourth semiconductor switch. Pulse width modulation of the fourth semiconductor switch allows for controlling a third current in a third one of the inductors operably connected to the lower boost circuit.

Advantageously, the first, second and third current controllers operate individually. An individual control of the semiconductor switches of the upper boost circuit, the lower boost circuit and the buck-boost circuit advantageously allows for controlling the voltage at the common node of the upper and lower boost circuits. This common node voltage is also available in the star point of the input filter capacitors. According to an aspect of the present disclosure, an offset value representative of a difference between a measured voltage at the common mode of the upper and lower boost circuits and a setpoint for this voltage is determined by the controller and fed as an offset value to inputs of the first, second and third current controllers.

One advantage of the current controllers is that the voltage in the star point of the input filter capacitors can be better controlled. This allows for reducing the load on the stages and to minimize duty cycle variation of the semiconductor switches, which is not only beneficial for the lifetime of the electrical components, but also allows for working efficiently at lower output voltages. As a result, electrical converters according to the present disclosure allow for an increased freedom of control of the electrical converter.

For the electrical three-phase AC-to-DC converter provided by the present disclosure, the half-switching-period volt-seconds product/area of the inductor coupled to the upper boost circuit and of the inductor coupled to the lower boost circuit are smaller than the volt-seconds products/areas of the boost inductors of a conventional six-switch boost-type PFC rectifier. This is because the voltages applied to these inductors are smaller than the three AC phase voltages in the case of a conventional six-switch boost-type PFC rectifier. For the inductor coupled to the buck-boost circuit, the applied voltages are not necessarily smaller but the value of the current flowing in the inductor is smaller than the value of the currents flowing in inductors of a conventional six-switch boost-type PFC rectifier. As a result, smaller inductors with less magnetic energy storage are feasible, resulting in a higher power-to-volume ratio of the electrical three-phase AC-to-DC converter that is provided by the present disclosure.

The electrical converter design according to aspects of the present disclosure therefore allows for controlling the current in the converter in an easy way with low input current distortion and with smaller hardware, in particular smaller magnetic energy storage elements, compared to prior art electrical converters. Moreover, the total cost of the semiconductor switches is lower, in particular since the semiconductor switches of the upper and lower boost bridge legs need to be rated for only half the DC output voltage (instead of the whole DC output voltage) and, also, since the switches of the phase selector are switching at a frequency equal to only six times the frequency of the AC grid voltage, which is substantially low. Overall, the switching stress/losses of the semiconductor devices are therefore reduced, resulting in an improved efficiency and lower cost of the electrical converter.

There are several embodiments of how the phase selector may be implemented to achieve the abovementioned conversion of a three-phase AC voltage provided at three phase inputs of the electrical converter into three intermediate DC voltages provided between an upper intermediate voltage node, a middle intermediate voltage node, and a lower intermediate voltage node.

The phase selector comprises three bridge legs whose midpoints are respectively connected to each of the three phase inputs. The three bridge legs can comprise controllable semiconductor switches (selector switches) which can be controlled using a controller to connect each of the phase inputs to either the upper intermediate voltage node, the middle intermediate voltage node, or the lower intermediate voltage node depending on the voltage level of the phase inputs.

The controller is advantageously configured to control the semiconductor switches in a way to connect the phase input with the highest voltage to the upper intermediate node, to connect the phase input with the lowest voltage to the lower intermediate node, and to connect the phase input having an intermediate voltage between the highest voltage and the lowest voltage to the middle intermediate node.

The input filter, which can form part of the boost circuit and/or the buck-boost circuit, comprises inductors which are advantageously connected between the phase selector and the output power stage, and can further comprise (high-frequency) filter capacitors which are advantageously placed between the phase selector and the inductors and are advantageously interconnecting the intermediate voltage nodes, such as in the form of a star connection. With such a configuration, the ripple values and the RMS values of the currents flowing in the phase selector are reduced.

Alternatively, the inductors of the input filter may be placed between the phase inputs and the phase selector and the capacitors of the input filter may be placed between the phase inputs and the inductors.

According to an aspect, the output filter comprises an upper output filter capacitor and a lower output filter capacitor which are connected in series between the output terminals of the electrical converter.

Advantageously, the electrical converter comprises means for measuring one or more of: the three-phase AC input voltage, the inductor currents (of the input filter inductors), and the DC output voltage. The measuring means can be coupled to the controller. The controller is advantageously configured to generate (PWM) control signals for the semiconductor switches of the electrical converter (e.g. of the phase selector and/or the boost circuits and/or the buck-boost circuit) based on these measurements and possibly based on provided set-values.

Advantageously, the electrical converter has only two output terminals and is not suitable for applying split loads.

According to a second aspect of the present disclosure, there is provided a wireless charging system, or a magnetic resonance imaging apparatus comprising the electrical converter of the first aspect.

According to a third aspect, there is provided a method of converting a three phase AC input into a DC output as set out in the appended claims. The method is advantageously implemented in the electrical converter as set out above.

An aspect of the present disclosure relates to an electrical converter, that, for example may be used for converting a three-phase AC voltage from an electrical grid, which may be a low voltage (e.g. 380-400 Vrms at 50 Hz frequency) grid, into a high DC output voltage (e.g. 800 V).

BRIEF DESCRIPTION OF THE DRAWINGS

Aspects of the present disclosure will now be described in more detail with reference to the appended drawings, wherein same reference numerals illustrate same features and wherein.

DETAILED DESCRIPTION

Figure 1:
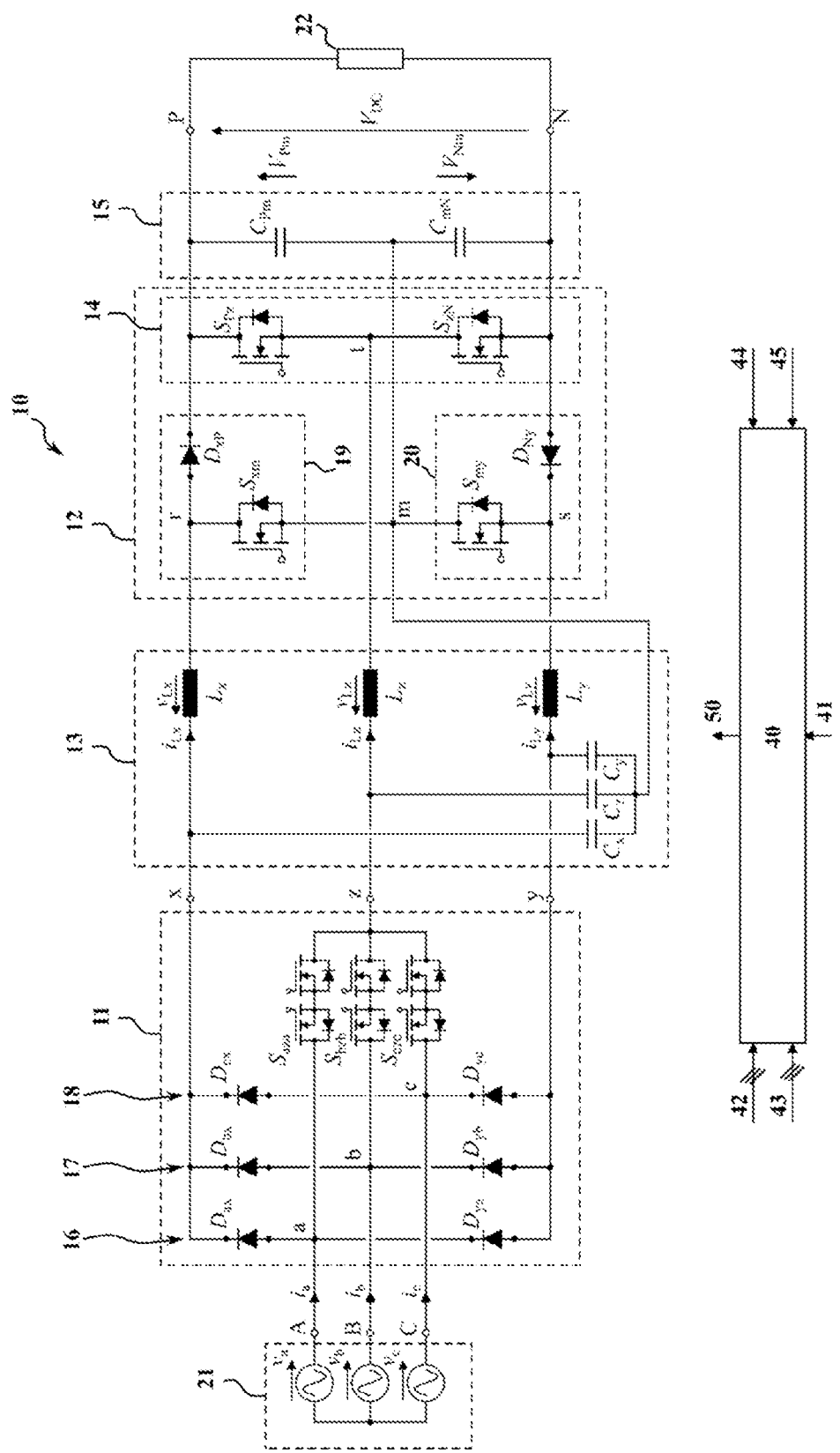
FIG. 1 schematically shows an electrical converter that is unidirectional according to an embodiment of the present disclosure.

FIG. 1 shows an electrical converter 10, referred to as the DUTCH RECTIFIER, comprising two power stages 11, 12 in the form of a three-phase active phase selector 11 and an output power stage 12. Electrical converter 10 further comprises an input filter 13, and an output filter 15.

The electrical converter 10 is an AC-to-DC converter that has three phase inputs A, B, C which are connected to a three-phase voltage of a three-phase AC grid 21, and two DC outputs P, N which for example may be connected to a DC load 22 such as, for example, a high voltage (e.g. 800 V) battery of an electric car.

The phase selector 11 comprises three phase connections a, b, c that are connected to the three phase inputs A, B, C, and three outputs x, y, z. These outputs may be seen as an upper intermediate voltage node x, a lower intermediate voltage node y, and a middle intermediate voltage node z.

The phase selector 11 comprises, or consists of, three bridge legs 16, 17, 18 which each comprise two passive semiconductor devices (diodes $D_{ax}$ and $D_{ya}$ for leg 16, $D_{bx}$ and $D_{yb}$ for leg 17, $D_{cx}$ and $D_{yc}$ for leg 18) connected in the form of a half bridge configuration, and three selector switches ($S_{aza}$, $S_{bzb}$, and $S_{czc}$) which each comprise two anti-series connected actively switchable semiconductor devices. Each such switchable semiconductor device advantageously has an anti-parallel diode. In this example, Metal Oxide Field Effect Transistors (MOSFETs) are used for the actively switchable semiconductor devices, and each includes an internal anti-parallel body diode that may replace an external anti-parallel diode.

The output power stage 12 comprises, or consists of, two stacked boost bridge legs 19, 20 and one buck-boost bridge leg 14. Each boost bridge leg (19, 20) comprises a boost switch ($S_{xm}$ for the upper boost bridge leg 19 and $S_{my}$ for the lower boost bridge leg 20) and boost diode ($D_{xP}$ for the upper boost bridge leg 19 and $D_{Ny}$ for the lower boost bridge leg 20) connected in a half-bridge configuration. The buck-boost bridge leg 14 comprises two buck-boost switches ($S_{Pz}$ and $S_{zN}$) connected in a half-bridge configuration. The middle node r of the upper boost bridge leg 19 is connected to intermediate voltage node x via an upper boost inductor $L_x$, the middle node s of the lower boost bridge leg 20 is connected to intermediate voltage node y via a lower boost inductor $L_y$, and the middle node t of the buck-boost bridge leg 14 is connected to intermediate voltage node z via a middle buck-boost inductor $L_z$.

The common node m of both boost bridge legs 19, 20 is connected to the midpoint of the output filter 15 which comprises two output filter capacitors $C_{Pm}$, $C_{mN}$ that are connected in series between the upper output node P and the lower output node N.

The upper boost bridge leg 19 is connected between the upper output node P and the common node m (i.e. in parallel with the upper output filter capacitor $C_{Pm}$), and is arranged in a way that current can flow from the intermediate voltage node x to the upper output node P via the diode $D_{xP}$ when the switch $S_{xm}$ is open (not conducting, off state), and current can flow from the intermediate voltage node x to the common node m (or vice versa) via the switch $S_{xm}$ when the switch $S_{xm}$ is closed (conducting, on state). The boost switch ($S_{xm}$) of the boost bridge leg 19 is an actively switchable semiconductor device, for example a MOSFET.

The lower boost bridge leg 20 is connected between the common node m and the lower output node N (i.e. in parallel with the lower output filter capacitor $C_{mN}$), and is arranged in a way that current can flow from the lower output node N to the intermediate voltage node y via the diode $D_{Ny}$ when the switch $S_{my}$ is open (not conducting, off state), and current can flow from the common node m to the intermediate voltage node y (or vice versa) via the switch $S_{my}$ when the switch $S_{my}$ is closed (conducting, on state). The boost switch ($S_{my}$) of the boost bridge leg 20 is an actively switchable semiconductor device, for example a MOSFET.

The buck-boost bridge leg 14 is connected between the upper output node P and the lower output node N (i.e. in parallel with the DC load 22) and is arranged in a way that current can flow from the intermediate voltage node z to the upper output node P (or vice versa) when the switch $S_{Pz}$ is closed (conducting, on state) while the switch $S_{zN}$ is open (not conducting, off state), and current can flow from the intermediate voltage node z to the lower output node N (or vice versa) when the switch $S_{zN}$ is closed (conducting, on state) while the switch $S_{Pz}$ is open (not conducting, off state). The buck-boost switches ($S_{Pz}$, $S_{zN}$) of the buck-boost bridge leg 14 are actively switchable semiconductor devices, e.g. MOSFETs, which are controlled in a complementary way (i.e. the one is closed while the other is open and vice versa).

Advantageously, three high-frequency (HF) filter capacitors $C_x$, $C_y$, $C_z$, which are part of the input filter 13, are interconnecting the intermediate voltage nodes x, y, z in the form of a star-connection. Generally, it is advantageous that the three capacitors $C_x$, $C_y$, $C_Z$ have substantially equal value so as to symmetrically load the AC grid.

The bridge leg of the phase selector 11 that is connected with the phase input A, B, or C that has the highest voltage of the three-phase AC input voltage is switched in a way that the corresponding phase input A, B, or C is connected to the upper intermediate voltage node x. To achieve this, the bridge leg connects the corresponding phase connection a, b, or c with the node x via the upper diode ($D_{ax}$, $D_{bx}$, $D_{cx}$) of the bridge leg, while the corresponding selector switch ($S_{aza}$, $S_{bzb}$, $S_{czc}$) of the bridge leg is open (not conducting, off state). The bridge leg of the phase selector 11 that is connected with the phase input A, B, or C that has the lowest voltage of the three-phase AC input voltage is switched in a way that the corresponding phase input A, B, or C is connected to the lower intermediate voltage node y. To achieve this, the bridge leg connects the corresponding phase connection a, b, or c with the node y via the lower diode ($D_{ya}$, $D_{yb}$, $D_{yc}$) of the bridge leg, while the corresponding selector switch ($S_{aza}$, $S_{bzb}$, $S_{czc}$) of the bridge leg is open (not conducting, off state). The bridge leg of the phase selector 11 that is connected with the phase input A, B, or C that has a voltage between the highest voltage and the lowest voltage of the three-phase AC input voltage is switched in a way that the corresponding phase input A, B, or C is connected to the middle intermediate voltage node z. To achieve this, the bridge leg connects the corresponding phase connection a, b, or c with the node z via the selector switch ($S_{aza}$, $S_{bzb}$, $S_{czc}$) which is closed (conducting, on state).

Figure 2A:
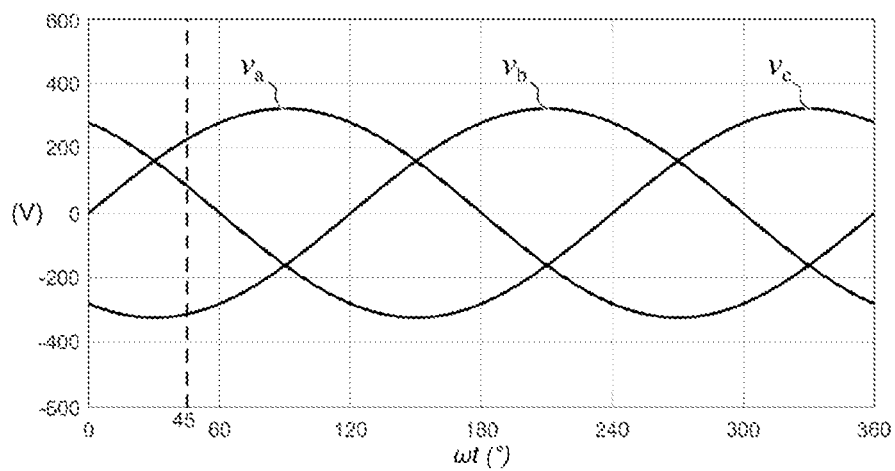
FIGS. 2A-G show diagrams with respectively voltages (FIG. 2A, 2B, 2C), currents (FIG. 2D, 2E) and switching states of the phase-selector switches (FIG. 2F) and switching states of the switches of the boost (upper and lower) and buck-boost circuits (FIG. 2G) during a 360° period of the AC mains voltage, and illustrates the overall operating principle of the electrical converter according to an embodiment of the present disclosure.
Figure 2B:
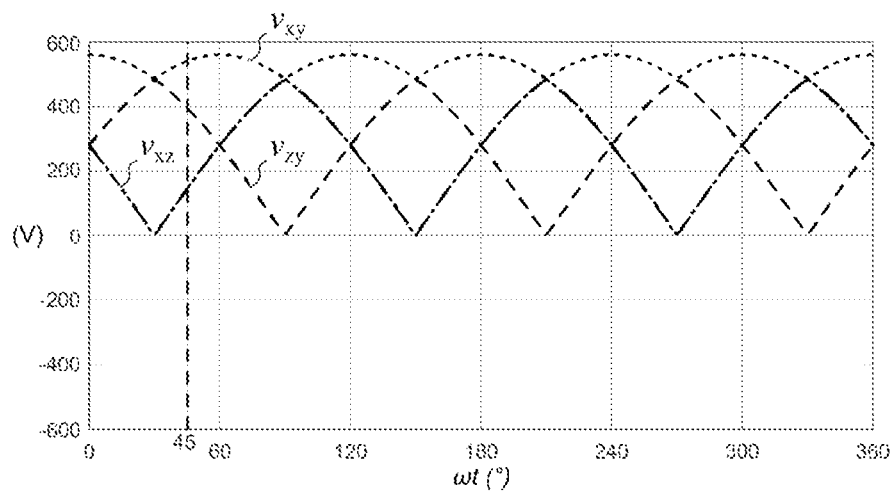
Figure 2C:
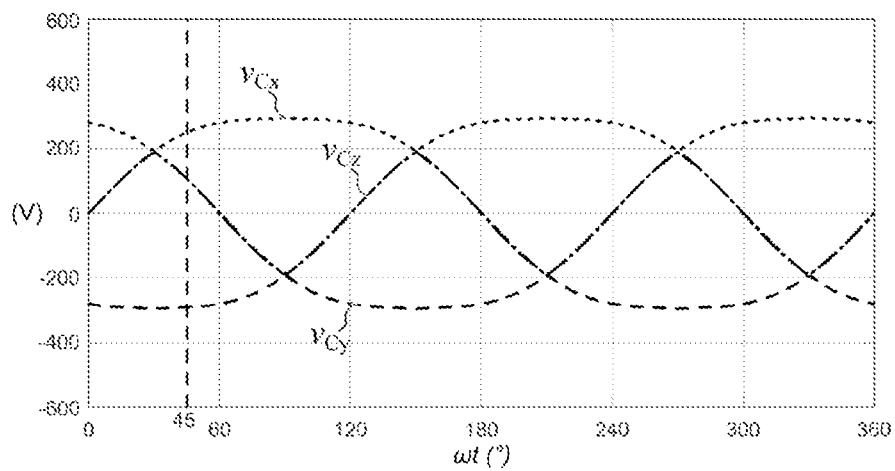

In a three-phase AC grid with substantially balanced phase voltages, for example as shown in FIG. 2A, the three-phase AC input voltage (shown in FIG. 2A) is converted into three intermediate DC voltages ($v_{xz}$, $v_{zy}$, $v_{xy}$; shown in FIG. 2B) provided between the upper intermediate voltage node x, the lower intermediate voltage node y and the middle intermediate voltage node z. These DC voltages thus show piece-wise sinusoidal shapes. The conversion of the three-phase AC input voltage into three intermediate DC voltages is the result of the operation of the phase selector 11, as explained above. The switching states (switch on→S=1, switch off→S=0) of the selector switches ($S_{aza}$, $S_{bzb}$, $S_{czc}$) are shown in FIG. 2F. It can be seen that the switches are 'on' or 'off' continuously during whole particular 60° sectors within the period (360°) of the AC mains voltage. Also the diodes of the phase selector are 'conducting' or 'not conducting' during whole particular sectors, e.g. of 60°, within the period (360°) of the AC mains voltage. The combination of states of the switches and diodes is unique for every 60° sector of the three-phase AC input voltage and depends on the voltage value of the phase inputs (A, B, C). The sequence of the 6 unique states of the switches and diodes repeats itself every period (360°) of the AC mains voltage.

Seen from the viewpoint of the intermediate voltage nodes x, y, z towards the output terminals P, N, a conventional DC-DC boost circuit (upper boost circuit) is formed, comprising the HF filter capacitor $C_x$, the upper boost inductor $L_x$, the upper boost bridge leg 19, and the upper output capacitor $C_{Pm}$. The input voltage of this upper boost circuit is the voltage $v_c$, (shown in FIG. 2C) across capacitor $C_x$ and the output voltage of this upper boost circuit is the voltage $V_{Pm}$ across the upper output capacitor $C_{Pm}$, having a voltage value that is substantially equal to half the total DC bus voltage ($V_{Pm} \approx V_{DC}/2$). The formed upper boost circuit may be operated by PWM modulation of the switch $S_{xm}$ at a specified, possibly variable, switching frequency $f_s$ so as to control the current in the upper boost inductor $L_x$.

Seen from the viewpoint of the intermediate voltage nodes x, y, z towards the output terminals P, N, a conventional 'inversed' (negative input voltage and negative output voltage) DC-DC boost circuit (lower boost circuit) is formed, comprising the HF filter capacitor $C_y$, the lower boost inductor $L_y$, the lower boost bridge leg 20, and the lower output capacitor $C_{mN}$. The input voltage of this lower boost circuit is the voltage $v_{Cy}$, (shown in FIG. 2C) across capacitor $C_y$ and the output voltage of this lower boost circuit is the voltage $V_{Nm}$ across the lower output capacitor $C_{mN}$, having a voltage value that is substantially equal to minus half the total DC bus voltage ($V_{Nm} \approx -V_{DC}/2$). The formed lower boost circuit may be operated by PWM modulation of the switch $S_{my}$ at a specified, possibly variable, switching frequency $f_s$ so as to control the current in the lower boost inductor $L_y$.

Seen from the viewpoint of the intermediate voltage nodes x, y, z towards the output terminals P, N, a conventional DC-DC buck-boost circuit (middle buck-boost circuit) is formed, comprising the HF filter capacitor $C_Z$, the middle buck-boost inductor $L_z$, the buck-boost bridge leg 14, and the series connection of the output capacitors $C_{Pm}$, $C_{mN}$. This DC-DC buck-boost circuit may be seen as to be similar to a single-phase half-bridge voltage-source converter (VSC). The input voltage of this middle buck-boost circuit is the voltage $v_{Cz}$ (shown in FIG. 2C) across capacitor $C_z$ and the output voltage of this middle buck-boost circuit is the output voltage $V_{DC}$ across the series connection of the output capacitors $C_{Pm}$, $C_{mN}$. The formed middle buck-boost circuit may be operated by PWM modulation of the switches $S_{Pz}$, $S_{zN}$ at a specified, possibly variable, switching frequency $f_s$ so as to control the current in the middle buck-boost inductor $L_z$.

Figure 2D:
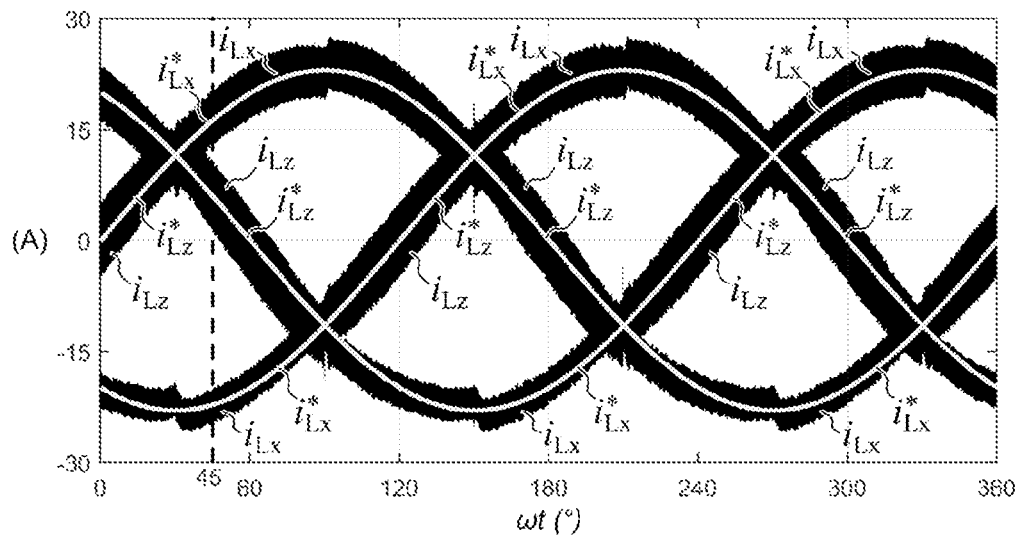
Figure 2E:
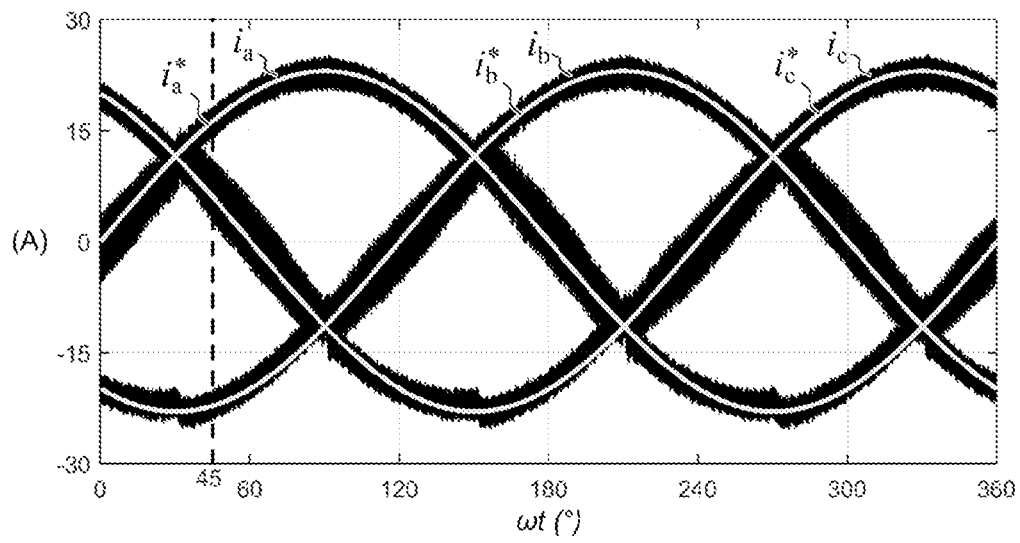
Figure 2F:
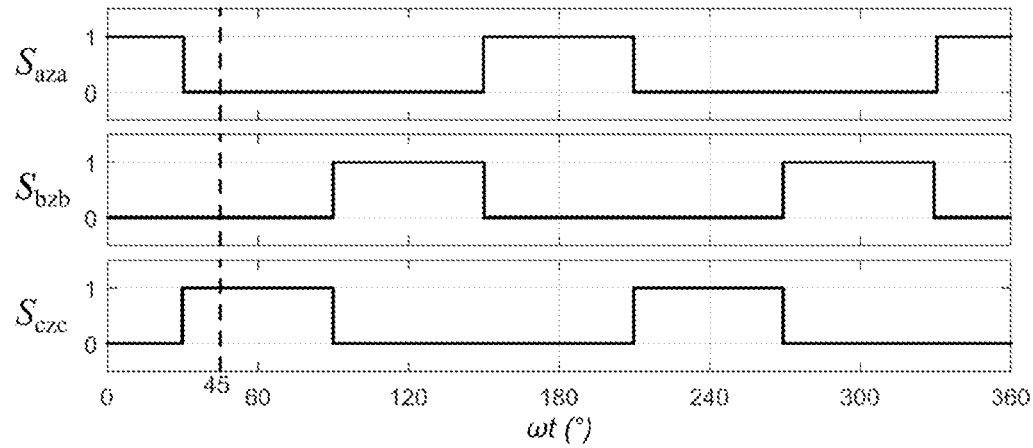
Figure 2G:
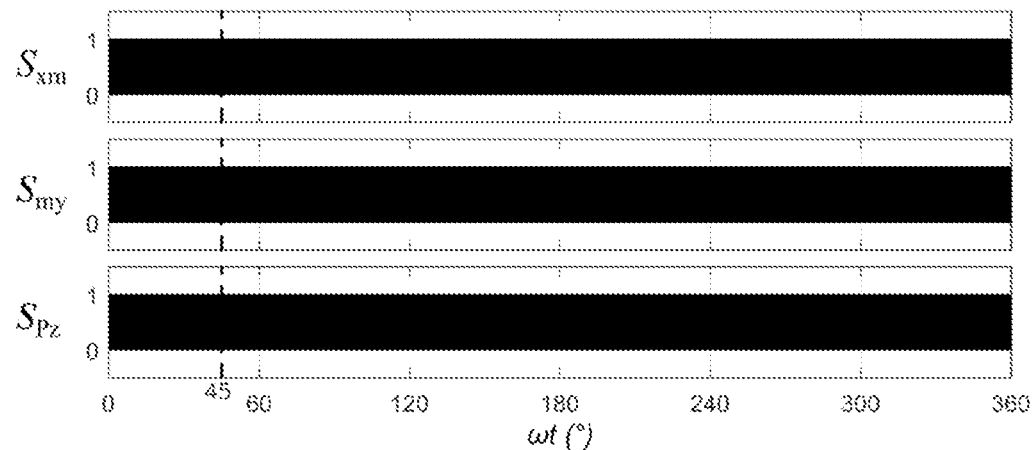

FIG. 2G shows the state of the switch $S_{xm}$ of the upper boost bridge leg 19, the state of the switch $S_{my}$ of the lower boost bridge leg 20, and the state of the switch $S_{Pz}$ (note that the state of the switch $S_{zN}$ is the complement of the state of the switch $S_{Pz}$) of the middle buck-boost bridge leg 14. The switches $S_{xm}$, $S_{my}$, $S_{Pz}$, $S_{zN}$ are all PWM modulated as can be seen from the black-colored bars, indicating PWM modulation of the corresponding switch.

An example of the currents $i_{Lx}$, $i_{Ly}$, $i_{Lz}$ in the inductors $L_x$, $L_y$, $L_z$ is shown in FIG. 2D. As can be seen, these currents are controlled to have piece-wise sinusoidal shapes and are transformed, i.e., as a result of the operation of the phase selector 11, into three sinusoidal AC phase currents $i_a$, $i_b$, $i_c$ which are shown in FIG. 2E.

Figure 3:
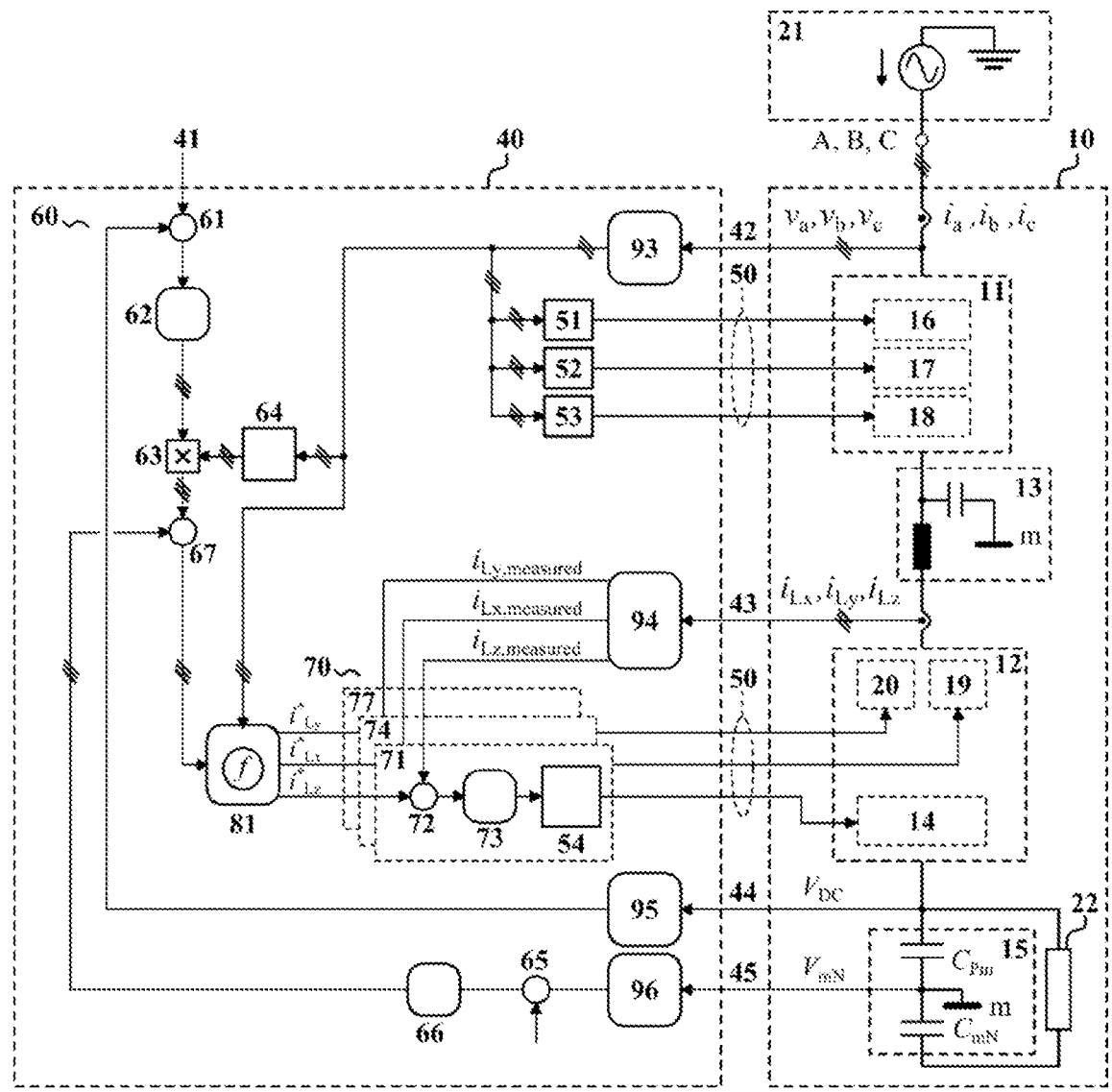
FIG. 3 shows a block diagram of an advantageous implementation of a central control unit and control method according to an embodiment of the present disclosure.

Referring to FIG. 1 and FIG. 3, to accomplish the piece-wise sinusoidal shapes of inductor currents $i_{Lx}$, $i_{Ly}$, $i_{Lz}$, a central control unit 40 may be used which controls all the controllable semiconductor devices (switches) of the electrical converter 10, sending control signals to each switch via a communication interface 50. In particular, semiconductor devices $S_{aza}$, $S_{bzb}$, $S_{czc}$, $S_{xm}$, $S_{my}$, $S_{Pz}$, $S_{zN}$ are controlled by controller 40. Furthermore, the control unit has measurement input ports (42, 43, 44, 45), for receiving measurements of:
42: the AC-grid phase voltages $v_a$, $v_b$, $v_c$;
43: the inductor currents $i_{Lx}$, $i_{Ly}$, $i_{Lz}$;
44: the DC bus voltage $V_{Dc}$;
45: the DC bus mid-point voltage $V_{mn}=-V_{nm}$,
and an input port 41 to receive a set-value, which may be a requested DC output voltage $V_{DC}*$.

FIG. 3 shows a block diagram of an advantageous implementation of the central control unit 40 which is shown in a schematically way in FIG. 1. The electrical converter 10 is represented in FIG. 3 as a 'single-wire' equivalent circuit, wherein the annotations of the elements correspond with those given in FIG. 1. Three slashes in a signal line indicate the bundling of three phase signals, and may represent the transition to a vector representation.

The goal of the control unit 40 is to control the output voltage $V_{DC}$ to a requested set-value $V_{DC}*$ that is received from an external unit via input port 41, and to balance the voltage across the two output capacitors $C_{Pm}$ and $C_{mN}$, for example by controlling the voltage across the lower output capacitor $C_{mN}$ to be substantially equal to half the DC bus voltage. Additionally, the current drawn from the phase inputs (a, b, c) needs to be shaped substantially sinusoidal and controlled substantially in phase with the corresponding phase voltage. As explained previously, this can also be achieved by controlling the inductor currents $i_{Lx}$, $i_{Ly}$, $i_{Lz}$) i.e., instead of directly controlling the phase currents $i_a$, $i_b$, $i_c$, to have piece-wise sinusoidal shapes. In particular, the low-pass filtered values of the inductor currents are controlled while the high-frequency ripple of the inductor currents is filtered by the HF filter capacitors ($C_x$, $C_y$, $C_Z$).

The control of the output voltage $V_{DC}$ is advantageously done using a cascaded control structure, comprising an outer voltage control loop 60 and inner current control loop 70. The set-value of the output voltage is input to a comparator 61 via input port 41, and is compared with the measured output voltage obtained from a measurement processing unit 95 (for example comprising a low-pass filter). The output of comparator 61 is the control-error signal of the output voltage, which is further input to a control element 62 (for example comprising a proportional-integral control block) that outputs the instantaneous set-values of the amplitudes of the phase currents. These amplitudes are input to multiplier 63, and multiplied with signals that are obtained from calculation element 64 that outputs normalized instantaneous values of the phase voltages. The input of calculation element 64 are the measured phase voltages obtained from a measurement processing unit 93 (for example comprising a low-pass filter). The output of the multiplier 63 are set-values $i_a*$, $i_b*$, $i_c*$ for the instantaneous, for example low-pass filtered, phase currents $i_a$, $i_b$, $i_c$ and co b) c) are shaped substantially sinusoidal and positioned substantially in phase with the corresponding phase voltages. The set-values $i_a*$, $i_b*$, $i_c*$ are input to the current controller 70 after passing an addition element 67 and a selection element 81 whose functions are further detailed in the following text.

The current controller 70 is split into three individual current controllers 71, 74, 77, wherein:
individual current controller 71 is used for controlling the current in the middle buck-boost inductor $L_z$. This control is done by PWM modulation of the switches $S_{Pz}$, $S_{zN}$ of the middle buck-boost circuit containing middle buck-boost bridge leg 14. As a result of the operation of the phase selector 11, therewith, controller 71 controls the current of the phase input A, B, C, that has a voltage between the highest voltage and the lowest voltage of the three-phase AC voltage;
individual current controller 74 is used for controlling the current in the upper boost inductor $L_x$. This control is done by PWM modulation of the switch $S_{xm}$ of the upper boost circuit containing upper boost bridge leg 19. As a result of the operation of the phase selector 11, therewith, controller 74 controls the current of the phase input A, B, C, that has the highest voltage of the three-phase AC voltage;
individual current controller 77 is used for controlling the current in the lower boost inductor $L_y$. This control is done by PWM modulation of the switch $S_{my}$ of the lower boost circuit containing lower boost bridge leg 20. As a result of the operation of the phase selector 11, therewith, controller 77 controls the current of the phase input A, B, C, that has the lowest voltage of the three-phase AC voltage.

Selector element 81 is used to send the set-values $i_a*$, $i_b*$, $i_c*$ (shown in FIG. 2D) for the instantaneous phase currents to the correct individual current controller (71, 74, 77) depending on the voltage value of the phase inputs (A, B, C), resulting in inductor current set-values $i_{Lx}*$, $i_{Ly}*$, $i_{Lz}*$ (shown in FIG. 2E) for each inductor current controller, wherein:
the set-value of the phase current of the phase input A, B, C, that has the highest voltage of the three-phase AC voltage is sent to individual current controller 74, resulting in set-value $i_{Lx}*$;
the set-value of the phase current of the phase input A, B, C, that has the lowest voltage of the three-phase AC voltage is sent to individual current controller 77, resulting in set-value $i_{Ly}*$;

the set-value of the phase current of the phase input A, B, C, that a voltage between the highest voltage and the lowest voltage of the three-phase AC voltage is sent to individual current controller 71, resulting in set-value $i_{Lz}^*$.

In each individual current controller the received set-value ($i_{Lx}^*$, $i_{Ly}^*$, $i_{Lz}^*$) for the instantaneous inductor current is input to a comparator, for example comparator 72 of individual current controller 71, and compared with the measured inductor current obtained from a measurement processing unit 94 (for example comprising a low-pass filter). The output of the comparator is the control-error signal of the current, which is further input to a control element, for example control element 73 of individual current controller 71, whose output is input to a PWM generation element, for example PWM generation element 54 of individual current controller 71. The PWM generation element of the individual current controllers generate the PWM-modulated control signals for the controllable semi-conductor switches of the PWM-controlled bridge legs, i.e. the upper boost bridge leg 19 of the upper boost circuit, the lower boost bridge leg 20 of the lower boost circuit, and the middle buck-boost bridge leg 14 of the middle buck-boost circuit. These PWM-modulated control signals are sent to the appropriate bridge legs via communication interface 50.

The selector switches of the phase selector 11 are either 'on' or 'off' during each 60° sector of the three-phase AC input voltage, depending on the voltage value of the phase inputs (A, B, C). The control signals for the selector switches are generated by switch-signal generators 51, 52, 53.

DC bus mid-point balancing is done by adding an offset value to the set-values $i_a^*$, $i_b^*$, $i_c^*$ for the instantaneous, for example low-pass filtered, phase currents $i_a$, $i_b$, $i_c$, which are output by multiplier 63. The offset value is obtained by comparing the measured DC bus midpoint voltage obtained from a measurement processing unit 96 (for example comprising a low-pass filter) with a set-value (for example $V_{DC}/2$) using comparator 65 and feeding the error signal output by the comparator 65 into a control element 66.

The phase currents $i_a$, $i_b$, $i_s$ shown in FIG. 2E are obtained by controlling the electrical converter 10 using such control unit 40 and control method detailed in the foregoing text. Also shown in FIG. 2E are the set-values $i_a^*$, $i_b^*$, $i_c^*$ for the instantaneous, for example low-pass filtered, phase currents $i_a$, $i_b$, $i_c$ as input to selector element 81 shown in FIG. 3. As explained above, the phase currents $i_a$, $i_b$, $i_c$ are indirectly controlled, i.e., they are the result of the controlling of the inductor currents $i_{Lx}$, $i_{Ly}$, $i_{Lz}$ (shown in FIG. 2D) and the operation of the phase selector 11. The set-points for the inductor currents ($i_{Lx}^*$, $i_{Ly}^*$, $i_{Lz}^*$) are derived from set-values $i_a^*$, $i_b^*$, $i_c^*$ by selector element 81 based on the measured phase voltages.

Figure 4A:
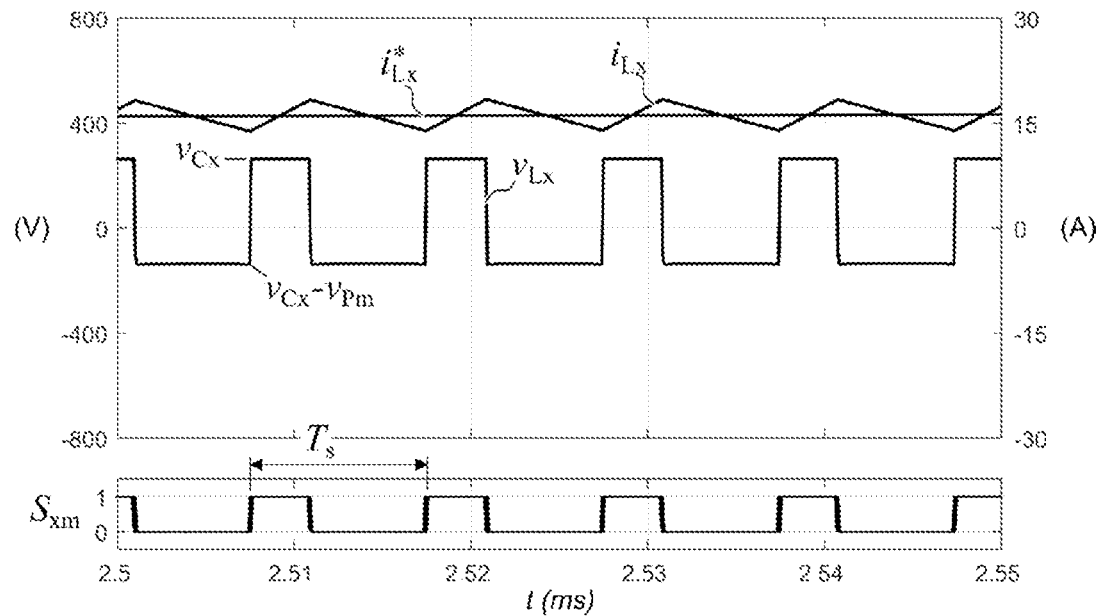
FIG. 4A, 4B, 4C show diagrams with voltages, currents and switching states within five consecutive switching cycles of the boost (upper and lower) and buck-boost bridge legs of the electrical converter, and illustrates the PWM modulation of these bridge legs according to an embodiment of the present disclosure.
Figure 4B:
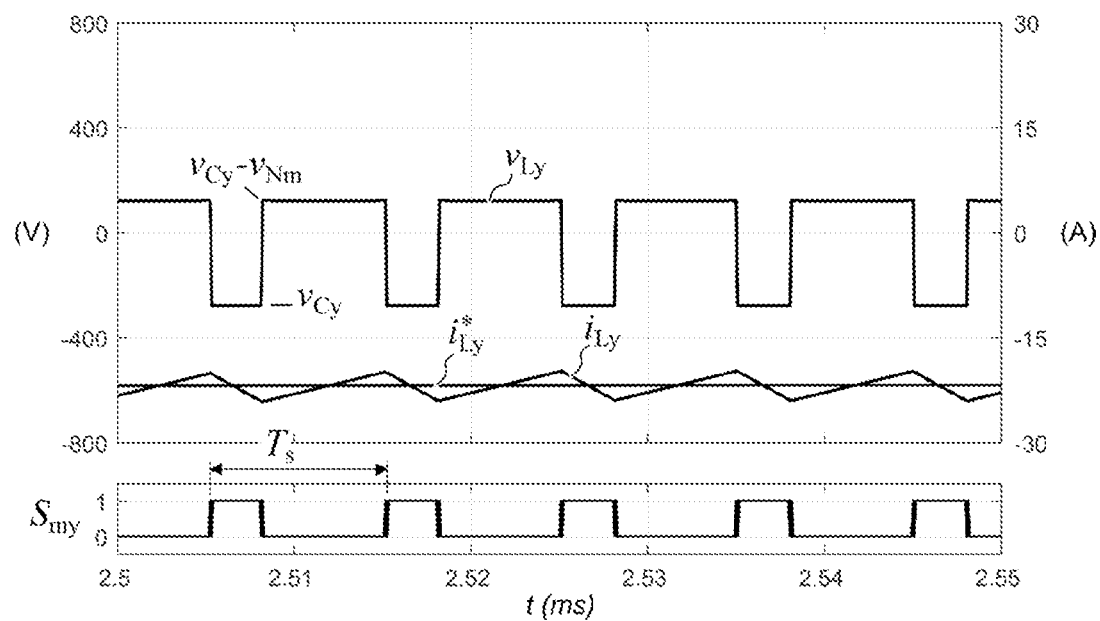
Figure 4C:
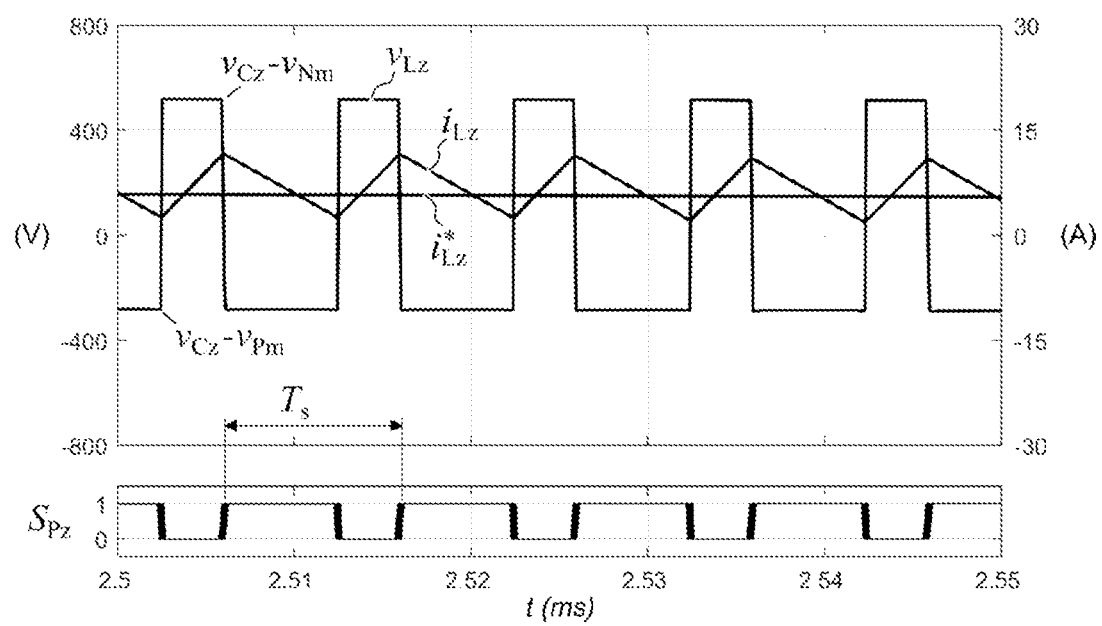

FIGS. 4A-4C show diagrams within five consecutive switching cycles (i.e., each having a switching period $T_s$ equal to $1/f_s$, with $f_s$ the switching frequency) of the bridge legs of the electrical converter 10, for a time interval around $\omega t=45°$ which lies within the sector of the three-phase AC input voltage where $0 \leq \omega t < 60°$ (see FIG. 2). Within this sector, the selector switches and diodes of the phase selector 11 are in the following switching states:

Switch $S_{aza}=0$ (off), diode $D_{ax}=1$ (conducting), diode $D_{ya}=0$ (blocking); phase connection a is connected with node x;

Switch $S_{bzb}=0$ (off), diode $D_{bx}=0$ (blocking), diode $D_{yb}=1$ (conducting); phase connection b is connected with node y;

Switch $S_{czc}=1$ (on), diode $D_{cx}=0$ (blocking), diode $D_y,=0$ (blocking); phase connection c is connected with node z;

The diagrams of FIGS. 4A-4C show voltages, currents, and switching signals on a milliseconds time axis. FIG. 4A corresponds with the operation of the upper boost circuit, showing the corresponding inductor current $i_{Lx}$ (and the set-value $i_{Lx}^*$, of this current), the inductor voltage $v_{Lx}$, and the control signal $S_{xm}$ of the switch of the PWM-modulated upper boost bridge leg 19. FIG. 4B corresponds with the operation of the lower boost circuit, showing the corresponding inductor current $i_{Ly}$ (and the set-value $i_{Ly}^*$ of this current), the inductor voltage $v_{Ly}$, and the control signal $S_{my}$ of the switch of the PWM-modulated lower boost bridge leg 20. FIG. 4C corresponds with the operation of the middle buck-boost circuit, showing the corresponding inductor current $i_{Lz}$ (and the set-value $i_{Lz}^*$ of this current), the inductor voltage $v_{Lz}$, and the control signal $S_{Pz}$ of the upper switch of the PWM-modulated bridge leg 14. Note that the control signal $S_{zN}$ of the lower switch of the PWM-modulated bridge leg 14 is the complement of the control signal $S_{Pz}$.

To minimize the Total Harmonic Distortion (THD) of the AC input current of the electrical converter, the high-frequency ripple of phase currents $i_a$, $i_b$, $i_c$ is advantageously minimized.

An advantage of the electrical converter 10 is that the half-switching-period volt-seconds product/area of the upper boost inductor and of the lower boost inductor are smaller than the volt-seconds products/areas of the boost inductors of a conventional six-switch boost-type PFC rectifier. This is because the voltages applied to these inductors are smaller than the three AC phase voltages in the case of a conventional six-switch boost-type PFC rectifier. For the middle buck-boost inductor, the applied voltages are not necessarily smaller but the value of the current flowing in the inductor is smaller than the value of the currents flowing in inductors of a conventional six-switch boost-type PFC rectifier. As a result, smaller inductors with less magnetic energy storage are feasible, resulting in a higher power-to-volume ratio of the electrical three-phase AC-to-DC converter 10 that is provided by the present disclosure.

Figure 5:
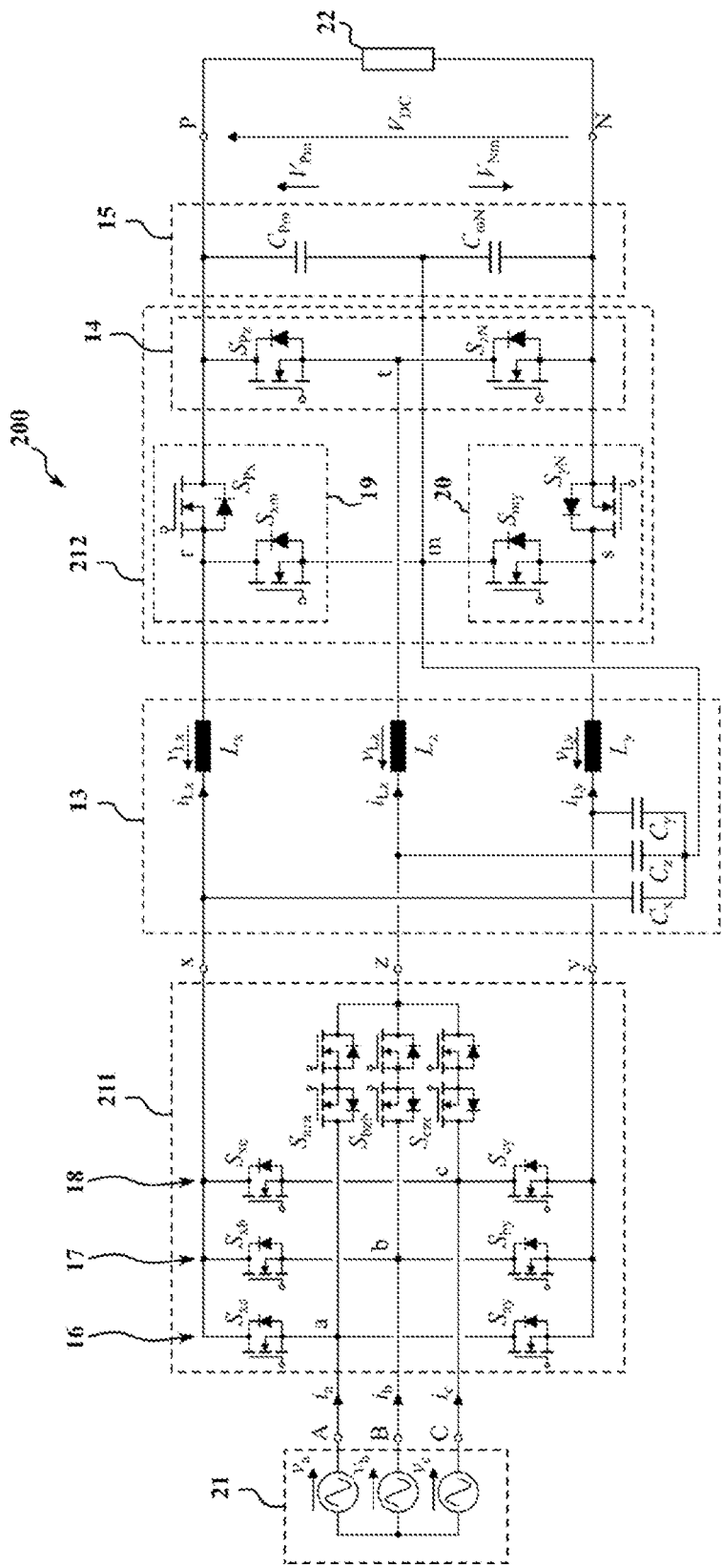
FIG. 5 schematically shows an electrical converter that is bidirectional according to an embodiment of the present disclosure.

The electrical converter 10 shown in FIG. 1 is unidirectional since the phase selector 11 and the output power stage 12 contain diodes, only allowing power to be drawn from the electrical AC grid 21 and provide this power at the output to a load 22. FIG. 5, on the other hand, shows an electrical converter 200 that is bidirectional. Electrical converter 200 differs from converter 10 in that the diodes ($D_{ax}$, $D_{bx}$, $D_{cx}$, $D_{ya}$, $D_{yb}$, $D_{yc}$) of the phase selector 11 and the diodes ($D_{xP}$, $D_{Ny}$) of the output power stage 12 of the converter shown in FIG. 1 have been replaced with controllable semiconductor switches ($S_{xa}$, $S_{xb}$, $S_{xc}$, $S_{ay}$, $S_{by}$, $S_{cy}$) in the phase selector 211 and ($S_{yN}$, $S_{Px}$) in the output power stage 212 respectively.

Figure 6:
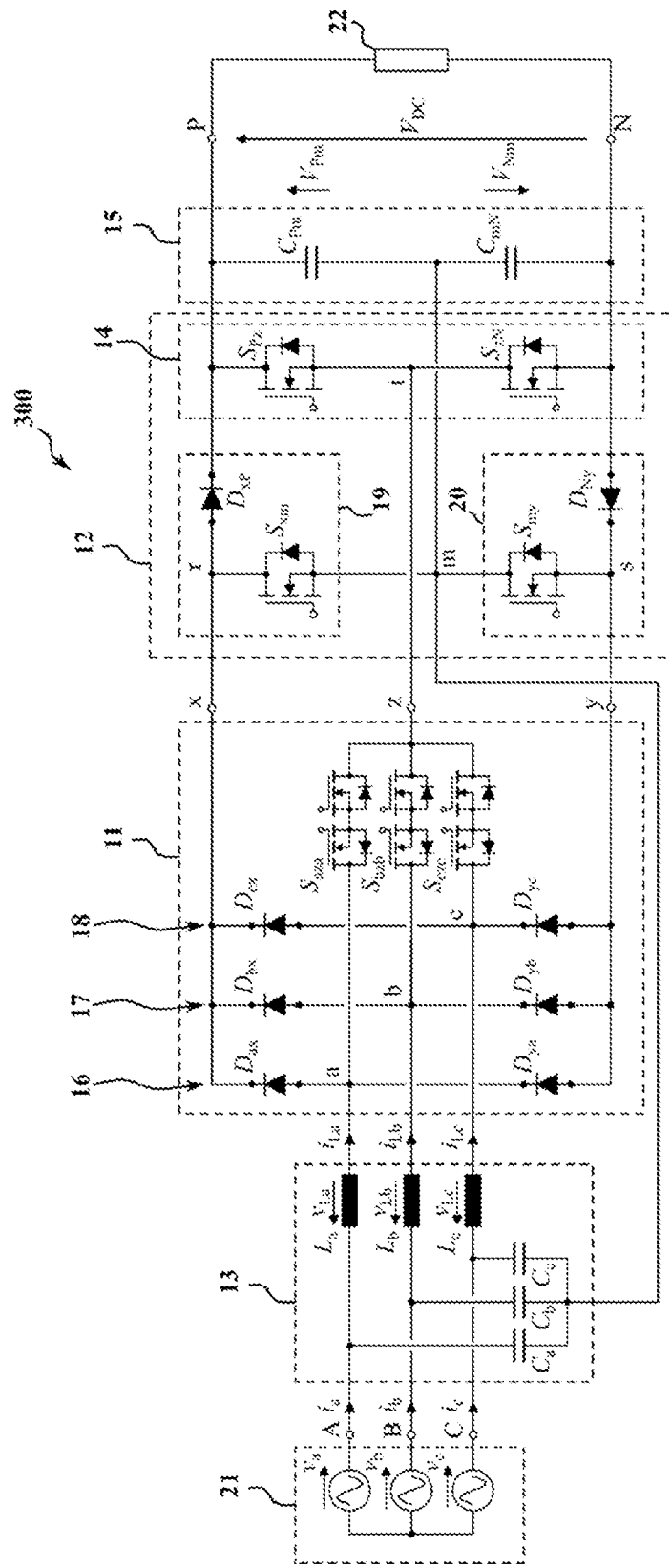
FIG. 6 schematically shows an electrical converter that is unidirectional, and that has an input filter that is placed before instead of after the phase selector according to an embodiment of the present disclosure.

In FIG. 6, an electrical converter 300 is shown which differs from converter 10 in that the input filter 13 is placed before (instead of after) phase selector 11, i.e. the input filter 13 is connected between the phase input terminals A, B, C and the phase selector 11. The phase selector 11 connects the phase input terminals A, B, C to the intermediate nodes x, y, z via the corresponding inductor $L_a$, $L_b$, $L_c$ of the input filter 13. Capacitors $C_a$, $C_b$, $C_c$ are arranged between the phase input terminals and the inductors. The capacitors are connected in a star configuration, advantageously with the star point connected to a midpoint of the output filter 15, just like in the previous examples. Alternatively, the capacitors $C_a$, $C_b$, $C_c$ can be arranged in a delta configuration across the three phase input lines. It will be convenient to note that in the example of FIG. 6, the voltage signal at the three intermediate nodes x, y, z is somewhat different as compared to the previous examples (FIG. 1, FIG. 5), since the phase selector will be switching high frequency voltages output by the input filter 13 rather than pure three phase sinusoidal signals supplied by source 21. As a result, high frequency currents will be flowing through the phase selector 11, whereas in the previous examples (FIG. 1 and FIG. 5) the high frequency currents only occur in the output power stage downstream of the input filter 13.

In either electrical converters 10, 200, and 300, diodes may be replaced by actively switchable semiconductor devices to allow for bidirectional power flow of the electrical converter.

In either electrical converters 10, 200 and 300, the HF capacitors $C_x$, $C_y$, $C_z$ (or $C_a$, $C_b$, $C_c$ in case of FIG. 6) are connected in a star configuration. The voltage in the star point connection is controlled by controlling the voltage at the common node m.

Figure 7A:
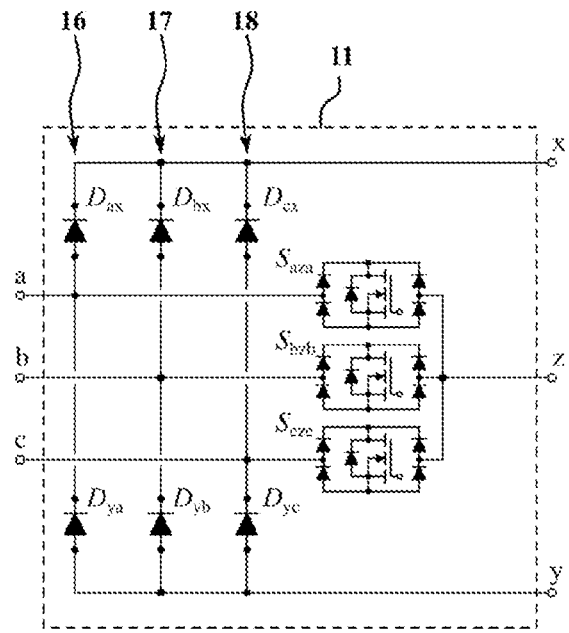
FIG. 7A shows a first variant of the phase selector that can be used in electrical converters of the present disclosure.
Figure 7B:
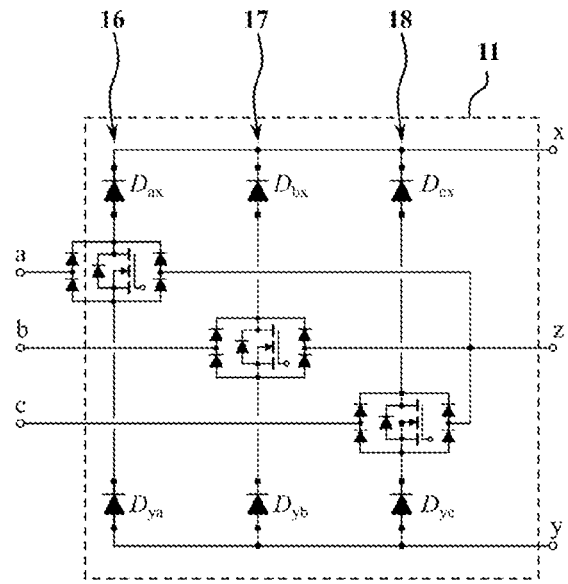
FIG. 7B shows a second variant of the phase selector that can be used in electrical converters of the present disclosure.
Figure 8A:
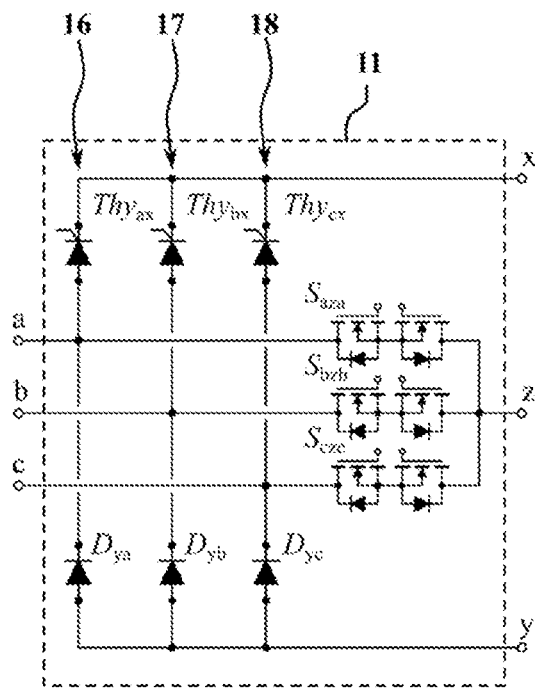
FIG. 8A shows another variant of a phase selector that can be used in electrical converters of the present disclosure.
Figure 8B:
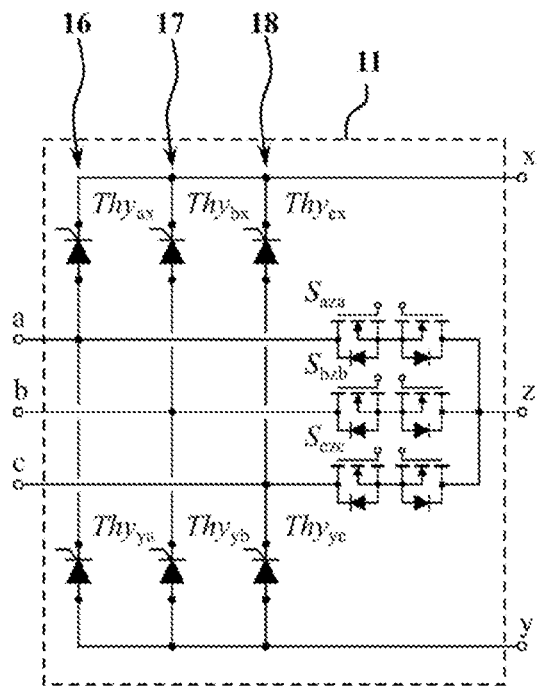
FIG. 8B shows yet another variant of a phase selector that can be used in electrical converters of the present disclosure.

FIG. 7A, 7B show different variants of the three-phase phase selector 11, which may be used in the electrical converters of either FIG. 1, FIG. 5, FIG. 6. In FIGS. 8A-B yet other variants of the three-phase phase selector 11 are shown. In these variants, the three bridge legs 16, 17 and 18 of the phase selector are arranged as half-controlled thyristor legs (FIG. 10A), i.e. comprising thyristors $Thy_{ax}$, $Thy_{bx}$, $Thy_{cx}$ in the bridge leg portions connected to the upper intermediate node and diodes in the other bridge leg portion connected to the lower intermediate node (or vice versa), or as full-controlled thyristor legs (FIG. 10B), i.e. comprising a thyristor $Thy_{ax}$, $Thy_{bx}$, $Thy_{cx}$, $Thy_{ya}$, $Thy_{yb}$, $Thy_{yc}$, in each bridge half leg, instead of diodes. Such a phase selector allows for controllably pre-charging the output filter capacitors $C_{Pm}$, $C_{mN}$, or $C_{PN}$ without requiring an additional pre-charge circuit.

Figure 9:
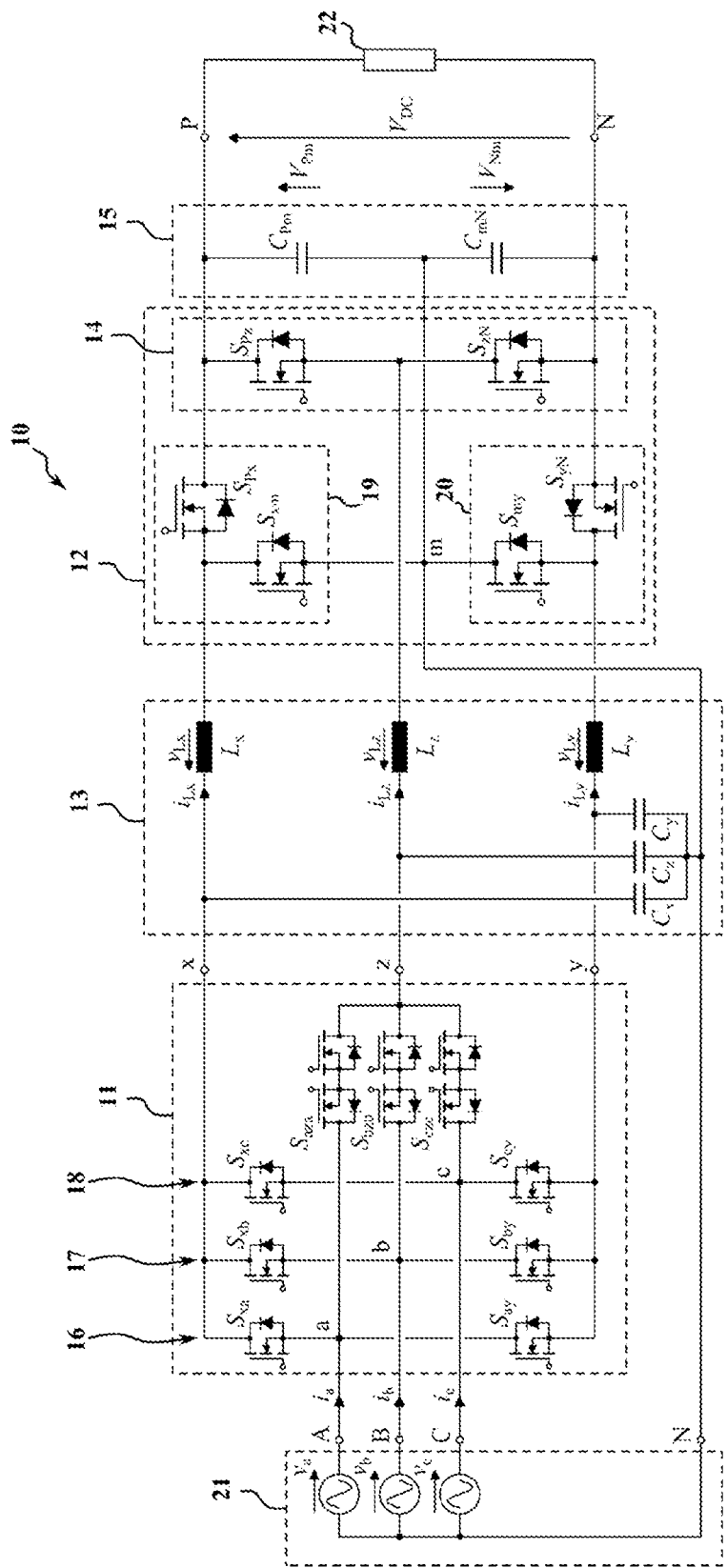
FIG. 9 represents an electrical converter according to aspects of the present disclosure that is unidirectional and comprises a connection terminal for connecting to the neutral conductor of the grid (fourth phase).

Referring to FIG. 9, the electrical converter 10 (and which may alternatively be the electrical converter 200 or 300) can comprise a connection terminal N for connecting the neutral conductor of the three-phase AC grid. In some applications, such as for example the charging of electric vehicles, it is often required that the amplitude of the sinusoidal current drawn from each phase of the three-phase grid can be independently controlled so as to be able to decrease the loading of a certain phase such that other consumer devices are still able to draw power from that particular phase during the charging of the vehicle's battery while not overloading the phase. In this case, the connection terminal N is advantageously connected to the neutral conductor of the three-phase grid, allowing a return current substantially equal to the sum of the three phase currents to flow back to the neutral conductor of the grid. In an advantageous aspect, the three phase currents can be fully independently controlled by providing a common node connected to the neutral conductor of the input.

The neutral connection terminal N is advantageously connected to the star-point of the AC capacitors $C_x$, $C_y$, $C_z$ and to the common node m of the stacked boost bridges 19, 20 (and thus also to the midpoint of the output filter 15). This results in a fully symmetrical converter structure. In this case, the voltage at the star-point and at the common node is equal to the voltage of the neutral conductor of the grid. Also in this case, the three current controllers 71, 74, 77 can be fed with an offset, e.g. a difference between the voltage of the common node m (voltage of neutral conductor) and a setpoint voltage. By so doing, a nonzero current can be injected in the neutral conductor, allowing to operate the converter with unbalanced phase currents and hence to control the three phase currents independently.

Other aspects of the present disclosure are set out in the following clauses:

A. Electrical converter (10) for converting a three-phase AC input into a DC output, comprising:
three phase input terminals (A, B, C) and two output terminals (P, N),
a phase selector (11) for connecting the three-phase AC input provided at the three phase input terminals to an upper intermediate node (x), a lower intermediate node (y) and a middle intermediate node (z) of the electrical converter, the phase selector comprising first semiconductor switches ($S_{aza}$, $S_{bzb}$, $S_{czc}$) that are actively switchable for selectively connecting the middle intermediate node to the three phase input terminals,
a boost circuit (19, 20, 423, 524) for converting a voltage at the upper intermediate node (x) and the lower intermediate node (y) to an output voltage at the two output terminals (P, N), and
a controller (40) configured to control switching of the first semiconductor switches according to a switching pattern in which:
the phase input terminal having a highest voltage is continuously connected to the upper intermediate node,
the phase input terminal having a lowest voltage is continuously connected to the lower intermediate node, and
the phase input terminal having an intermediate voltage between the highest voltage and the lowest voltage is continuously connected to the middle intermediate node,
wherein the electrical converter comprises a buck-boost circuit (14) having an output connected to the two output terminals (P, N) in parallel with an output of the boost circuit, the buck-boost circuit comprising at least two second semiconductor switches ($S_{Pz}$, $S_{zN}$) that are actively switchable, wherein the at least two second semiconductor switches are connected in series across the output terminals (P, N), and wherein the middle intermediate node (z) is connected to a common node (t) of the at least two second semiconductor switches.

B. Electrical converter of clause A, wherein the boost circuit comprises at least one third semiconductor switch ($S_{xm}$, $S_{my}$, $S_{xy}$) that is actively switchable and at least one fourth semiconductor switch ($D_{xP}$, $D_{Ny}$, $S_{Px}$, $S_{yN}$), wherein the at least one third semiconductor switch and the at least one fourth semiconductor switch are connected in series across the output terminals (P, N).

C. Electrical converter of clause B, comprising an output filter (15) comprising a series of at least two filter capacitors ($C_{Pm}$, $C_{mN}$) connected across the output terminals (P, N), wherein the boost circuit comprises a common node (m), an upper boost bridge leg (19) comprising a first one ($S_{xm}$) of the at least one third semiconductor switch connected across the upper intermediate node (x) and the common node (m), and a lower boost bridge leg (20) comprising a second one of the at least one third semiconductor switch ($S_{my}$) connected across the common node (m) and the lower intermediate node (y), wherein the common node (m) is connected to a midpoint of the output filter.

D. Electrical converter of any one of the preceding clauses, comprising an input filter (13), the input filter comprising an inductor ($L_x$, $L_y$, $L_z$, $L_a$, $L_b$, $L_c$) operably connected to each one of the upper intermediate node (x), the lower intermediate node (y) and the middle intermediate node (z).

E. Electrical converter of clause D, wherein each of the inductors ($L_x$, $L_y$, $L_z$, $L_a$, $L_b$, $L_c$) is connected:
  between the respective intermediate node (x, y, z) and the boost circuit, respectively the buck-boost circuit (14), or
  between one of the phase input terminals (A, B, C) and the phase selector (11).

F. Electrical converter of clause D or E, wherein the input filter (13) comprises capacitors ($C_x$, $C_y$, $C_z$, $C_a$, $C_b$, $C_c$) operably connected to the inductors ($L_x$, $L_y$, $L_z$, $L_a$, $L_b$, $L_c$).

G. Electrical converter of clause F, wherein the capacitors ($C_x$, $C_y$, $C_z$, $C_a$, $C_b$, $C_c$) are connected between the phase input terminals (A, B, C) and the inductors ($L_x$, $L_y$, $L_z$, $L_a$, $L_b$, $L_c$).

H. Electrical converter of clause F or G, wherein the capacitors ($C_x$, $C_y$, $C_z$, $C_a$, $C_b$, $C_c$) are interconnected in the form of a delta connection or star connection.

I. Electrical converter of clause H in conjunction with clause C, wherein the capacitors ($C_x$, $C_y$, $C_z$, $C_a$, $C_b$, $C_c$) are interconnected in a star connection and wherein the common node (m) is connected to a star point of the star connection.

J. Electrical converter of any one of the clauses D to I, comprising means (94) for measuring a current ($i_{Lx}$, $i_{Ly}$, $i_{Lz}$, $i_{La}$, $i_{Lb}$, $i_{Lc}$) through at least one of the inductors ($L_x$, $L_y$, $L_z$, $L_a$, $L_b$, $L_c$), and wherein the controller (40) comprises a current control loop (70) configured to adapt a first pulse width modulation control signal fed to the at least two second semiconductor switches based on the current measured ($i_{Lx}$, $i_{Ly}$, $i_{Lz}$, $i_{La}$, $i_{Lb}$, $i_{Lc}$).

K. Electrical converter of clause J, wherein the means for measuring the current is configured to measure the current in respect of the phase input terminal having the intermediate voltage.

L. Electrical converter of clause J or K in conjunction with clause 2 or 3, wherein the controller (40) is configured to generate a second pulse width modulation control signal fed to the at least one third semiconductor switch ($S_{xm}$, $S_{my}$, $S_{xy}$), wherein the first and second pulse width modulation control signals are interleaved.

M. Electrical converter of any one of the preceding clauses, comprising means (93) for measuring voltages at the three phase input terminals and means (96) for measuring a voltage at the output terminals, both being coupled to the controller (40).

N. Electrical converter of any one of the preceding clauses, wherein the phase selector comprises three selector legs (16, 17, 18) for interconnecting one of the three phase input terminals to the upper intermediate node (x), the lower intermediate node (y) and the middle intermediate node (z), wherein each of the three selector legs comprises a half bridge comprising fifth semiconductor switches ($D_{ax}$, $D_{bx}$, $D_{cx}$, $D_{ya}$, $D_{yb}$, $D_{yc}$, $S_{xa}$, $S_{xb}$, $S_{xc}$, $S_{ay}$, $S_{by}$, $S_{cy}$).

O. Electrical converter of clause N, wherein the fifth semiconductor switches are actively switchable ($S_{xa}$, $S_{xb}$, $S_{xc}$, $S_{ay}$, $S_{by}$, $S_{cy}$).

P. Electrical converter of any one of the clauses D to 0 in conjunction with clause B or C, wherein the at least one fourth semiconductor switch ($S_{Px}$, $S_{yN}$) is actively switchable.

Q. Wireless charging system, in particular for charging a battery of an electric vehicle, comprising a power supply unit, the power supply unit comprising the electrical converter of any one of the preceding clauses.

R. Magnetic resonance imaging apparatus comprising a gradient amplifier, the gradient amplifier comprising the electrical converter of any one of the clauses A to P.

S. Method of converting a three phase AC input into a DC output, comprising:
  rectifying the three phase AC input to obtain a rectified intermediate voltage across an upper intermediate node (x), a lower intermediate node (y) and a middle intermediate node (z), wherein a phase input of the three phase AC input having a highest voltage is continuously applied to the upper intermediate node (x), a phase input of the three phase AC input having a lowest voltage is continuously applied to the lower intermediate node (y), and a phase input of the three phase AC input having an intermediate voltage between the highest voltage and the lowest voltage is continuously applied to the middle intermediate node (z), and
  boosting the rectified intermediate voltage to obtain the DC output,
  wherein the boosting step comprises connecting the middle intermediate node (z) to a buck-boost circuit (14).

T. Method of clause S, wherein the boosting step comprises using a boost circuit (19, 20, 423, 524) connected across the upper and lower intermediate node and wherein outputs of the boost circuit and the buck-boost circuit (14) are connected in parallel.

The invention claimed is:

1. An electrical converter for converting a three-phase AC input into a DC output, the electrical converter comprising:
  three phase input terminals and two output terminals,
  a phase selector for connecting the three-phase AC input provided at the three phase input terminals to an upper intermediate node, a lower intermediate node and a middle intermediate node of the electrical converter, the phase selector comprising three rectifier bridge legs connected to the upper intermediate node and the lower intermediate node and first semiconductor switches that are actively switchable for selectively connecting the middle intermediate node to the three phase input terminals,
  a controller configured to control switching of the first semiconductor switches according to a switching pattern in which the phase input terminal having an intermediate voltage between the highest voltage and the lowest voltage is connected to the middle intermediate node,
  a boost circuit for converting a voltage at the upper intermediate node and the lower intermediate node to an output voltage at the two output terminals,
  a buck-boost circuit having an output connected to the two output terminals in parallel with an output of the boost circuit, the buck-boost circuit comprising at least two second semiconductor switches that are actively switchable, wherein the at least two second semiconductor switches are connected in series across the output terminals, wherein the middle intermediate node is connected to a first common node of the at least two second semiconductor switches, and
  an output filter comprising a series of at least two filter capacitors connected across the output terminals;
  wherein the boost circuit comprises a second common node, an upper boost circuit comprising a third actively switchable semiconductor switch connected across the upper intermediate node and the second common node, and a lower boost circuit comprising a fourth semiconductor switch connected across the second common node and the lower intermediate node,
  wherein the second common node is connected to a midpoint of the output filter, wherein the electrical converter comprises an input filter, the input filter comprising inductors operably connected to each one of the upper boost circuit, the lower boost circuit and the buck-boost circuit, wherein the input filter comprises capacitors operably connected to the inductors, wherein the capacitors are interconnected in a star connection and wherein the second common node is connected to a star point of the star connection, wherein the controller comprises a first current controller configured to generate a first pulse width modulated control signal for the at least two second semiconductor switches, a second current controller configured to generate a second pulse width modulated control signal for the third semiconductor switch, and a third current controller configured to generate a third pulse width modulated control signal for the fourth semiconductor switch, and wherein the controller is configured to determine an offset value representative of a difference between a measured voltage of the second common node and a setpoint voltage of the second common node and to feed the offset value to an input of the first, second and third current controllers.

2. The electrical converter of claim 1, wherein the inductors are operably connected to each one of the upper intermediate node, the lower intermediate node and the middle intermediate node.

3. The electrical converter of claim 2, wherein the inductors are connected between a respective one of the upper intermediate node, the lower intermediate node and the middle intermediate node and a respective one of the upper boost circuit, the lower boost circuit and the buck-boost circuit.

4. The electrical converter of claim 2, wherein the capacitors are connected between the phase input terminals and the inductors.

5. The electrical converter of claim 2, wherein each of the inductors is connected between one of the phase input terminals and the phase selector.

6. The electrical converter of claim 1, comprising a first measurement unit configured to measure a current through at least one of the inductors, and wherein a first current control loop is configured to adapt the first pulse width modulation control signal fed to the at least two second semiconductor switches based on the current measured.

7. The electrical converter of claim 6, wherein the first measurement unit is configured to measure the current in respect of the phase input terminal having the intermediate voltage.

8. The electrical converter of claim 6, wherein the controller is configured to generate the second and third pulse width modulation control signals interleaved with the first pulse width modulation control signal.

9. The electrical converter of claim 1, comprising a second measurement unit configured to measure voltages at the three phase input terminals and a third measurement unit configured to measure a voltage at the output terminals, both the second and the third measurement units being coupled to the controller.

10. The electrical converter of claim 1, wherein the three bridge legs of the phase selector comprise fifth semiconductor switches that are actively switchable.

11. The electrical converter of claim 1, wherein the upper boost circuit and the lower boost circuit each comprise a sixth semiconductor switch between the respective upper and lower intermediate node and the respective one of the two output terminals that is actively switchable.

12. A wireless charging system comprising a power supply unit, the power supply unit comprising the electrical converter of claim 1.

13. A magnetic resonance imaging apparatus comprising a gradient amplifier, the gradient amplifier comprising the electrical converter of claim 1.

14. A method of converting a three phase AC input into a DC output, the method comprising:

rectifying the three phase AC input to obtain a rectified intermediate voltage across an upper intermediate node, a lower intermediate node and a middle intermediate node, wherein a phase input of the three phase AC input having a highest voltage is applied to the upper intermediate node, a phase input of the three phase AC input having a lowest voltage is applied to the lower intermediate node, and a phase input of the three phase AC input having an intermediate voltage between the highest voltage and the lowest voltage is applied to the middle intermediate node, and boosting the rectified intermediate voltage to obtain the DC output, wherein boosting the rectified intermediate voltage comprises connecting the middle intermediate node to a buck-boost circuit, and connecting a boost circuit across the upper and lower intermediate node, wherein outputs of the boost circuit and the buck-boost circuit are connected in parallel, wherein the boost circuit comprises an upper boost circuit connected between a common node and the upper intermediate node and a lower boost circuit connected between the lower intermediate node and the common node, wherein boosting the rectified intermediate voltage comprises operably connecting an input filter comprising inductors and star-interconnected capacitors to the upper intermediate node, the lower intermediate node and the middle intermediate node, and connecting a star point of the capacitors to the common node, connecting an output filter comprising a series of at least two filter capacitors across two output terminals, and connecting the common node to a midpoint of the output filter individually controlling pulse width modulated control signals fed to semiconductor switches of the upper boost circuit, the lower boost circuit and the buck-boost circuit, measuring a voltage at the common node and determining an offset value representative of a difference between the measured voltage of the common node and a setpoint voltage of the common node, and using the offset value to adapt the pulse width modulated control signals.

15. The method of claim 14, further comprising interleaving pulse width modulation control of semiconductor switches of the upper boost circuit, the lower boost circuit, and the buck-boost circuit.

16. An electrical converter for converting a three-phase AC input into a DC output, the electrical converter comprising:

three phase input terminals and two output terminals, a phase selector for connecting the three-phase AC input provided at the three phase input terminals to an upper intermediate node, a lower intermediate node and a middle intermediate node of the electrical converter, the phase selector comprising three rectifier bridge legs connected to the upper intermediate node and the lower intermediate node and first semiconductor switches that are actively switchable for selectively connecting the middle intermediate node to the three phase input terminals, a controller configured to control switching of the first semiconductor switches according to a switching pattern in which the phase input terminal having an intermediate voltage between the highest voltage and the lowest voltage is connected to the middle intermediate node, a boost circuit for converting a voltage at the upper intermediate node and the lower intermediate node to an output voltage at the two output terminals, a buck-boost circuit having an output connected to the two output terminals in parallel with an output of the boost circuit, the buck-boost circuit comprising at least two second semiconductor switches that are actively switchable, wherein the at least two second semiconductor switches are connected in series across the output terminals, wherein the middle intermediate node is connected to a first common node of the at least two second semiconductor switches, and an output filter comprising a series of at least two filter capacitors connected across the output terminals;

wherein the boost circuit comprises a second common node, an upper boost circuit comprising a third actively switchable semiconductor switch connected across the upper intermediate node and the second common node, and a lower boost circuit comprising a fourth semiconductor switch connected across the second common node and the lower intermediate node, wherein the second common node is connected to a midpoint of the output filter, wherein the electrical converter comprises an input filter, the input filter comprising inductors operably connected to each one of the upper boost circuit, the lower boost circuit and the buck-boost circuit, wherein the input filter comprises capacitors operably connected to the inductors, wherein the capacitors are interconnected in a star connection and wherein the second common node is connected to a star point of the star connection, wherein the controller comprises a first current controller configured to generate a first pulse width modulated control signal for the at least two second semiconductor switches, a second current controller configured to generate a second pulse width modulated control signal for the third semiconductor switch, and a third current controller configured to generate a third pulse width modulated control signal for the fourth semiconductor switch, and wherein the controller is configured to determine an offset value representative of a difference between a measured voltage of the second common node and a setpoint voltage of the second common node and to adapt the first, second and third pulse width modulated control signals on the basis of the offset value.

* * * * *